2 Sheets—Sheet 1.

W. H. KNIGHT.

ELECTRIC RAILWAY.

No. 11,084. Reissued June 10, 1890

Witnesses
W. M. Trombly
A. E. Ford

Inventor
Walter H. Knight
by Bentley & Knight
Attys.

THE NORRIS PETERS CO. PHOTO-LITHO., WASHINGTON, D. C.

W. H. KNIGHT.

ELECTRIC RAILWAY.

No. 11,084. Reissued June 10, 1890.

Witnesses
H. M. Twombly
A. Allen

Inventor
Walter H. Knight
by Bentley & Knight
Atty

THE NORRIS PETERS CO. PHOTO-LITHO., WASHINGTON, D. C.

UNITED STATES PATENT OFFICE.

WALTER H. KNIGHT, OF NEWTON, MASSACHUSETTS

ELECTRIC RAILWAY.

SPECIFICATION forming part of Reissued Letters Patent No. 11,084, dated June 10, 1890.

Original No. 424,887, dated April 1, 1890. Application for reissue filed May 14, 1890. Serial No. 351,820.

*To all whom it may concern:*

Be it known that I, WALTER H. KNIGHT, a citizen of the United States, residing at Newton, in the county of Middlesex and State of Massachusetts, have invented certain new and useful Improvements in Electric Railways, of which the following is a specification.

My improvement relates to means for making a constant electric connection between the line-conductors of an electric railway and an electric locomotive traveling on said railway.

Figure 1:
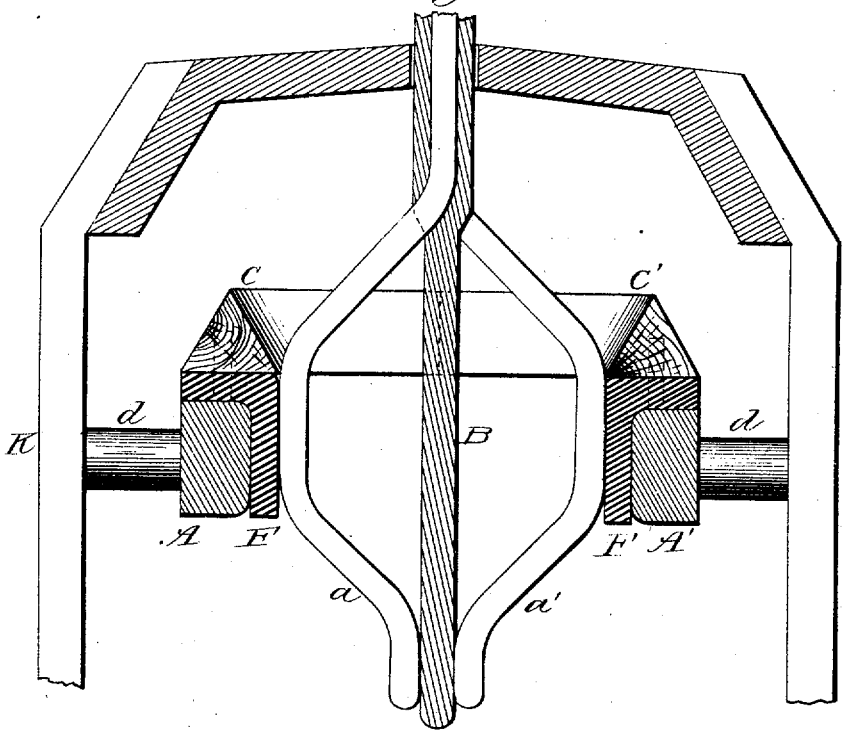
Figure 2:
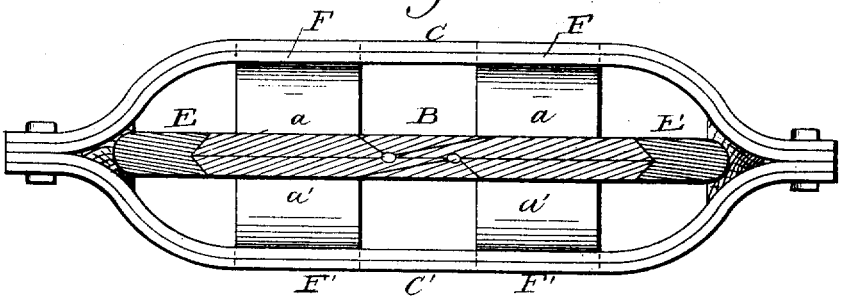
Figure 3:
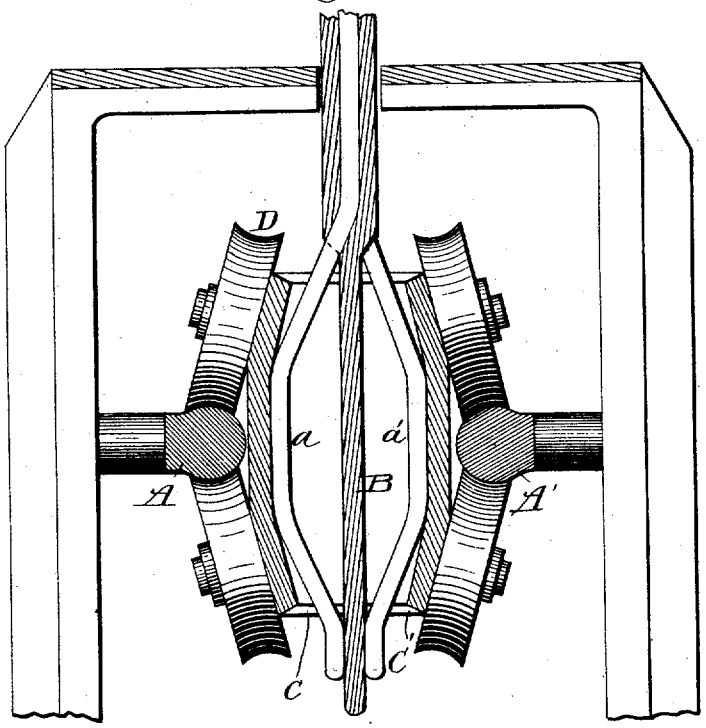
Figure 4:
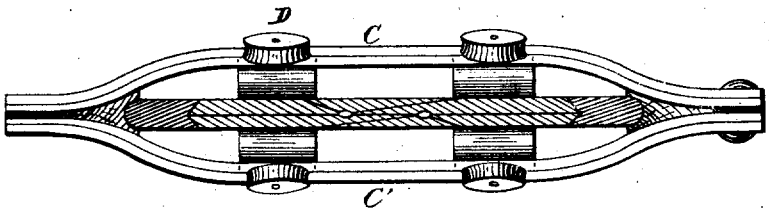

In the accompanying drawings, Figure 1 is a section of a slotted conduit, the main conductors, the contact device adapted to slide along said conductors, and a detachable connection with said device. Fig. 2 is a plan of the contact device and a section of the detachable connecting part. Figs. 3 and 4 are corresponding views of another form of my invention.

In Fig. 1 K represents a slotted conduit inclosing the two line-conductors A and A′, which are supported upon insulating-pins *d* from the side walls of the conduit and form the direct and return branches of the electric circuit.

C C′ are two bow-shaped pieces of insulating material—such as stout hickory wood—connected together at their ends, as shown in Fig. 2, and leaving a central opening or pocket between them. Upon the under side of each of these two bows are two contact makers or shoes F and F′, adapted to fit onto the conductors A and A′ and to travel along in electrical contact therewith.

B represents a flat strip of insulating material extending into the conduit through the slot, and having embedded therein two metallic strips *a a′*. At their lower ends these metallic strips are bent out, as shown in Fig. 1, and form two elliptic springs, which rest against the two shoes F and F′, respectively. The lower ends of *a* and *a′* are left free, so that they can be readily compressed. These springs constitute an automatically-detachable connection, by which the contact device is normally united with the locomotive both electrically and mechanically, while at the same time it permits the ready separation or disengagement of the contact device therefrom. It is also to be observed that this spring-connection is a yielding one, which will permit all slight movements between the depending plow and the contact-shoe which may be necessary in order to compensate for irregularities in the line, and that, too, without breaking the line-connection.

E E, Fig. 2, represent two metallic protecting-pieces placed in line with the insulating-strip B to protect the same from wear against the edges of the slot and extending down to engage with the two ends of the insulating-frame formed by the two pieces C C′, so as to propel the contact device formed by the said frame and the shoes F F′.

The strip B with its protecting-pieces E E and its conductors *a a′* form a plow anlogous to that shown in my patent, No. 305,731, dated September 23, 1884, and this plow is supported in any well-known way from an electric locomotive or vehicle traveling upon a track over the conduit, as is indicated in said patent.

It is apparent that should the plow for any reason be pulled upward the whole plow will be pulled out of the contact device, the springs *a a′* slipping up out of contact with the shoes F F′, and being compressed against the sides of B, so as to be readily withdrawn through the slot.

In Figs. 3 and 4 the contact-shoes F F′ are replaced by eight grooved rollers, two above and two below each of the conductors A A′. The rollers are journaled to the bow-shaped pieces C C′, which in this case are of metal, and are insulated from each other at the ends where they are joined, the whole forming a trolley which is adapted to travel along the two conductors and collect the current therefrom through the rollers. These rollers therefore serve as contact-makers, and, as shown, they engage opposite sides of the respective conductors in such a way as to grip the conductors and prevent the trolley from running off the same. It is also to be observed that the conductors themselves form a track along the line of the conduit upon which the trolley is supported, the upper set of rollers running on the track and the lower set extending down below the track and bearing upwardly against the line-conductors. The plow is of the same construction as that in Figs. 1 and 2.

What I claim is—

1. The combination of a slotted conduit, a conductor inclosed therein, a contact device adapted to travel along said conductor, and an insulated conductor extending into said conduit and having a detachable connection with said contact device.

2. The combination of a slotted conduit, a conductor inclosed therein, a contact-shoe supported upon and riding along said conductor, and an insulated conductor extending through said slot and having a detachable connection with said contact-shoe.

3. The combination of a slotted conduit, a conductor inclosed therein, a depending plow provided with an insulated conductor extending through the slot, a contact device propelled thereby, and a detachable connection between said plow and contact device.

4. The combination of a slotted conduit, a conductor inclosed therein, a contact-shoe having freedom of longitudinal movement along said conductor, an insulated conductor extending into the conduit through the slot, and an electrical connection with the contact-shoe permitting freedom of movement.

5. The combination, in an electric railway, of a slotted conduit and electric conductor therein, a contact device permanently inclosed in said conduit and traveling in electrical contact with said conductor, and a detachable mechanical connection between said contact device and the electric locomotive.

6. The combination, in an electric railway, of a slotted conduit and electric conductor therein, a contact device permanently inclosed in said conduit and traveling in electrical contact with said conductor, and a detachable electrical connection between said contact device and the electric locomotive.

7. The combination, with an electric locomotive and a line-conductor, of a contact device traveling in electrical contact with the line-conductor, and an automatically-detachable connection between the contact device and the electric locomotive.

8. The combination of an electric locomotive, with a contact device traveling in electrical contact with the line-conductor, and an automatically-detachable electrical and mechanical connection for the contact device with the locomotive, permitting the ready separation of the contact device therefrom.

9. The combination, with a line-conductor and an electric locomotive, of a contact-trolley supported upon and riding along the line-conductor, and an automatically-detachable connection for the contact-trolley with the locomotive, whereby it may be readily separated therefrom.

10. The combination of a slotted conduit, a line-conductor inclosed therein, a contact-trolley traveling along the line of the conduit in electrical contact with the line-conductor, and an automatically-detachable connection for the trolley with an electric locomotive permitting its ready separation therefrom.

11. The combination of an electric locomotive with a contact device traveling in electrical contact with a line-conductor, and a spring-connection for the contact device with the locomotive, in which the spring normally preserves the attachment of the contact device to the locomotive, but permits its ready separation therefrom.

12. The combination of a slotted conduit and a conductor inclosed therein with an electric locomotive, a contact-trolley traveling along the line of the conduit in electrical contact with the conductor, and a spring-connection normally connecting the trolley with the locomotive, but permitting its ready separation therefrom.

13. The combination, with a slotted conduit and a conductor inclosed therein, of a contact-trolley in the conduit, a plow extending through the slot, and a yielding connection within the conduit, between the plow and trolley, permitting freedom of movement.

14. The combination of a slotted conduit, two line-conductors therein, a contact-trolley in the conduit riding along said conductors, and a plow extending through the slot to an electric locomotive and having a yielding connection with the trolley, permitting freedom of movement.

15. The combination of a conduit, a line-conductor inclosed therein, a contact-trolley traveling along the line of the conduit in electrical connection with the line-conductor, an electric locomotive, and an upright piece provided with a spring portion joining the trolley to the locomotive and permitting freedom of vertical movement, as described.

16. The combination of a conduit and inclosed line-conductor with a contact-trolley having an opening or pocket therein, and a plow extending through the slot and provided with a spring portion engaging the trolley, as set forth.

17. The combination of a slotted conduit and an inclosed line-conductor with an electric locomotive and a contact-trolley traveling along a track within the conduit and having a contact-maker extending down below the plane of the track and bearing upwardly against the line-conductor.

18. The combination of a slotted conduit and inclosed line-conductor with an electric locomotive and contact-trolley connected thereto, having a supporting wheel or wheels traveling along the line of the conduit and a contact-maker below the said wheel bearing upwardly against the line-conductor.

19. The combination of a slotted conduit and inclosed line-conductor with an electric locomotive, a contact-trolley supported upon and engaging opposite sides of the line-conductor, and an insulated conductor connected to the trolley and conducting current therefrom to the locomotive, as set forth.

20. The combination of a conduit and an inclosed line-conductor with an electric locomotive and a contact-trolley provided with grooved wheels engaging opposite sides of the conductor and drawn along the same by a connection to the locomotive, as set forth.

21. The combination of a conduit, a line-conductor therein, and an electric locomotive, with an insulated conductor extending through the slot, and a contact-trolley supported within the conduit and connected to the insulated conductor, whereby the said conductor forms both a mechanical and electrical connection between the trolley and electric locomotive.

In witness whereof I sign this specification, in the presence of two witnesses, this 28th day of April, 1890.

WALTER H. KNIGHT.

Witnesses:

CHAS. L. STURTEVANT,
STEPHEN JANNUS.